(12) United States Patent
Laselva et al.

(10) Patent No.: US 12,520,257 B2
(45) Date of Patent: Jan. 6, 2026

(54) USER EQUIPMENT SYNCHRONIZATION

(71) Applicant: NOKIA TECHNOLOGIES OY, Espoo (FI)

(72) Inventors: Daniela Laselva, Klarup (DK); Jorma Johannes Kaikkonen, Oulu (FI); Nuno Manuel Kiilerich Pratas, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 333 days.

(21) Appl. No.: 18/019,223

(22) PCT Filed: Jul. 19, 2021

(86) PCT No.: PCT/EP2021/070109
§ 371 (c)(1),
(2) Date: Feb. 1, 2023

(87) PCT Pub. No.: WO2022/028868
PCT Pub. Date: Feb. 10, 2022

(65) Prior Publication Data
US 2023/0276387 A1 Aug. 31, 2023

(30) Foreign Application Priority Data
Aug. 6, 2020 (EP) .................................... 20189747

(51) Int. Cl.
H04W 68/02 (2009.01)
H04W 8/22 (2009.01)
H04W 56/00 (2009.01)

(52) U.S. Cl.
CPC ......... H04W 56/0015 (2013.01); H04W 8/22 (2013.01); H04W 68/02 (2013.01)

(58) Field of Classification Search
CPC ......... H04W 52/0216; H04W 56/0015; H04W 68/02; H04W 8/22; Y02D 30/70
(Continued)

(56) References Cited

U.S. PATENT DOCUMENTS

| 2020/0221384 A1* | 7/2020 | Ang | H04L 5/0092 |
| 2023/0079204 A1* | 3/2023 | Nader | H04W 68/02 455/458 |
| 2023/0084343 A1* | 3/2023 | Berggren | H04L 5/0048 370/311 |

FOREIGN PATENT DOCUMENTS

WO 2019/063819 A1 4/2019

OTHER PUBLICATIONS

5G; NR; User Equipment (UE) radio access capabilities 3GPP TS 38.306 V16.1.0, Jul. 2020, Sophia Antipolis, pp. 31-32 (Year: 2020).*

(Continued)

Primary Examiner — Ayman A Abaza
Assistant Examiner — Abdul Aziz Santarisi
(74) Attorney, Agent, or Firm — Carter, DeLuca & Farrell LLP

(57) ABSTRACT

Certain examples of the present invention relate to a User Equipment, UE, comprising: means for sending, to a Radio Access Network, RAN, node, UE synchronization capability information indicative of time and/or frequency synchronization acquisition capability of the UE with a network; and means for receiving, from the RAN node, at least one Reference Signal, RS, prior to a paging occasion for the UE, that enables the UE to acquire time and/or frequency synchronization with the network, wherein the at least one RS is based in part on the UE synchronization capability information.

1 Claim, 4 Drawing Sheets

(58) Field of Classification Search
USPC .......................................................... 370/503
See application file for complete search history.

(56) References Cited

OTHER PUBLICATIONS

International Search Report and Written Opinion dated Sep. 28, 2021 corresponding to International Patent Application No. PCT/EP2021/070109.

3GPP TS 38.306 V16.1.0 (Jul. 2020), Technical Specification, 3rd Generation Partnership Project; Technical Specification Group Radio Access Network; NR; User Equipment (UE) radio access capabilities (Release 16), Jul. 24, 2020, pp. 1-106, XP051925831.

3GPP TS 36.304 V15.6.0 (Jul. 2020), Technical Specification, 3rd Generation Partnership Project; Technical Specification Group Radio Access Network; Evolved Universal Terrestrial Radio Access (E-UTRA); User Equipment (UE) procedures in idle mode (Release 15), Jul. 2020.

3GPP TS 38.304 V15.7.0 (Jul. 2020), Technical Specification, 3rd Generation Partnership Project; Technical Specification Group Radio Access Network; NR; User Equipment (UE) procedures in Idle mode and RRC Inactive state (Release 15), Jul. 2020.

3GPP TR 38.840 V16.0.0 (Jun. 2019), Technical Report, 3rd Generation Partnership Project; Technical Specification Group Radio Access Network; NR; Study on User Equipment (UE) power saving in NR (Release 16), Jun. 2019.

3GPP TS 38.211 V16.2.0 (Jun. 2020), Technical Specification, 3rd Generation Partnership Project; Technical Specification Group Radio Access Network; NR; Physical channels and modulation (Release 16), Jun. 2020.

3GPP TS 38.331 V16.1.0 (Jul. 2020), Technical Specification, 3rd Generation Partnership Project; Technical Specification Group Radio Access Network; NR; Radio Resource Control (RRC) protocol specification (Release 16), Jul. 2020.

3GPP TS 38.214 V16.2.0 (Jun. 2020), Technical Specification, 3rd Generation Partnership Project; Technical Specification Group Radio Access Network; NR; Physical layer procedures for data (Release 16), Jun. 2020.

* cited by examiner

USER EQUIPMENT SYNCHRONIZATION

TECHNOLOGICAL FIELD

The present disclosure relates generally to the field of wireless communications and in particular User Equipment (UE) synchronization in a wireless communications network. Some examples relate to time and/or frequency synchronization of a UE in an inactive or idle Radio Resource Control (RRC) state in a wireless communication network. Certain examples, though without prejudice to the foregoing, relate to provisioning one or more Reference Signals (RSs) in a Next Generation (NG) Radio Access Network (RAN) for enabling UE synchronization during a Discontinuous Reception (DRX) cycle.

BACKGROUND

In 5G New Radio (NR), once a UE transitions from an active RAN connection state (i.e. a Radio Resource Control (RRC) connected state) to an inactive or idle RAN connection state (i.e. an RRC inactive or idle state), the UE regularly monitors for paging from a NG-RAN node (e.g. 5G NR gNodeB (gNB)) informing the UE of any incoming data/call.

Paging is typically performed according to network defined paging monitoring occasions, or Paging Occasions (POs), for a UE within a paging cycle. Such a paging cycle may correspond to a DRX cycle of a UE in an RRC inactive state, during which the UE may be in a sleep/low power operational mode.

The UE periodically monitors for a paging message during its periodic POs. The POs may be configured periodically, with a period equal to a DRX cycle, within a Paging Transmission Window (PTW). Each PTW itself may be periodic with a period of a regular DRX cycle or an extended DRX (eDRX) cycle. The UE may be in a sleep mode prior to its PO and it may wake up slightly earlier than its PO to obtain timing/frequency synchronization with the network. Once the UE has timing/frequency synchronization, the UE may monitor, e.g. the Physical Downlink Control Channel (PDCCH), for a paging message. If there is no paging message for the UE, the UE may then go back to sleep until the next PO. The amount of time the UE is awake during a DRX cycle may include: a time period for achieving synchronization, a time period for monitoring during the PO (including an intervening time period between achieving synchronization and the PO), as well as time periods corresponding to a warm/ramp up time and a ramp down time.

Conventionally, UEs in RRC inactive or idle state would perform such synchronization operations based on one or more Synchronization Signal Blocks (SSBs) 201 transmitted by the NG-RAN node.

Some UEs (depending e.g. on their chipset vendor) may need to wake up well before their PO/DRX ON period and listen for one or more SSB burst instances (e.g. every 20 ms or more) before achieving synchronization and their local oscillator is locked to the appropriate frequency. This may increase the wake-up time of the UE, e.g. by a few tens or hundreds of milliseconds depending on the periodicity of the SSB bursts and the UE synchronization capabilities. Waking up several SSB instances before an actual paging monitoring occasion may mean that the UE is unable to go to a deep sleep state (due to a state switch delay, i.e. a delay for ramping up and down when transitioning from one state to another) giving rise to an increase in the UE's power consumption.

Conventional approaches to UE synchronization during RRC inactive or idle states are not always optimal. In some circumstances it may be desirable to speed-up UE synchronization. It may be desirable to improve the provisioning of one or more Reference Signals (RSs) for UE synchronization so as to increase the amount of sleep time of UEs in RRC inactive or idle state during DRX and thereby reduce UE power consumption. In some circumstances it may be desirable to improve the provisioning of RSs for UE synchronization so as to reduce signalling overhead for a NG-RAN node.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the independent claims. Any examples/embodiments and features described in this specification that do not fall under the scope of the independent claims are to be interpreted as examples useful for understanding various embodiments of the invention.

According to at least some examples of the disclosure there is provided a User Equipment, UE, comprising:
  means for sending, to a Radio Access Network, RAN, node, UE synchronization capability information indicative of time and/or frequency synchronization acquisition capability of the UE with a network; and
  means for receiving, from the RAN node, at least one Reference Signal, RS, prior to a paging occasion for the UE, that enables the UE to acquire time and/or frequency synchronization with the network, wherein the at least one RS is based in part on the UE synchronization capability information.

According to various, but not necessarily all, examples of the disclosure there is provided a method comprising:
  sending, from a User Equipment, UE, to a Radio Access Network, RAN, node, UE synchronization capability information indicative of time and/or frequency synchronization acquisition capability of the UE with a network; and
  receiving, at the UE from the RAN node, at least one Reference Signal, RS, prior to a paging occasion for the UE, that enables the UE to acquire time and/or frequency synchronization with the network, wherein the at least one RS is based in part on the UE synchronization capability information.

According to various, but not necessarily all, examples of the disclosure there is provided computer program instructions for causing an apparatus to perform:
  sending, from a User Equipment, UE, to a Radio Access Network, RAN, node, UE synchronization capability information indicative of time and/or frequency synchronization acquisition capability of the UE with a network; and
  receiving, at the UE from the RAN node, at least one Reference Signal, RS, prior to a paging occasion for the UE, that enables the UE to acquire time and/or frequency synchronization with the network, wherein the at least one RS is based in part on the UE synchronization capability information.

According to various, but not necessarily all, examples of the disclosure there is provided an apparatus comprising:
at least one processor; and
at least one memory including computer program instructions;
the at least one memory and the computer program instructions configured to, with the at least one processor, cause the apparatus at least to perform:
sending, from a User Equipment, UE, to a Radio Access Network, RAN, node, UE synchronization capability information indicative of time and/or frequency synchronization acquisition capability of the UE with a network; and
receiving, at the UE from the RAN node, at least one Reference Signal, RS, prior to a paging occasion for the UE, that enables the UE to acquire time and/or frequency synchronization with the network, wherein the at least one RS is based in part on the UE synchronization capability information.

According to various, but not necessarily all, examples of the disclosure there is provided a non-transitory computer readable medium encoded with instructions that, when performed by at least one processor, causes at least the following to be performed:
sending, from a User Equipment, UE, to a Radio Access Network, RAN, node, UE synchronization capability information indicative of time and/or frequency synchronization acquisition capability of the UE with a network; and
receiving, at the UE from the RAN node, at least one Reference Signal, RS, prior to a paging occasion for the UE, that enables the UE to acquire time and/or frequency synchronization with the network, wherein the at least one RS is based in part on the UE synchronization capability information.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

The following portion of this 'Brief Summary' section describes various features that can be features of any of the examples described in the foregoing portion of the 'Brief Summary' section.

In some but not necessarily all examples, the UE synchronization capability information comprises one or more of:
information indicative of time and/or frequency domain aspects related to the UE acquiring time and/or frequency synchronization with the network;
information indicative of an amount and/or level of estimated time and frequency drift of the UE in a time period; and
information indicative of a number of the at least one RSs required by the UE for the UE to acquire time and/or frequency synchronization with the network.

In some but not necessarily all examples, the UE further comprises:
means for receiving one or more characteristics of at least one RS intended to be sent by the RAN node prior to a paging occasion for the UE, wherein the at least one RS intended to be sent by the RAN node enables the UE to acquire time and/or frequency synchronization with the network; and means for determining the UE synchronization capability information based in part on the one or more characteristics of the at least one RS intended to be sent by the RAN node.

In some but not necessarily all examples, the one or more characteristics of the at least one RS comprises one or more of:
a time density of the at least one RS;
a bandwidth of the at least one RS;
a frequency domain density of the at least one RS;
a number of RSs or RS bursts in a time domain for a single RS transmission;
a number of Resource Elements, REs, in a symbol of the at least one RS;
a number of symbols in a slot or slots of the at least one RS; and
a time difference between symbols containing the RSs.

In some but not necessarily all examples, the at least one RS comprises one or more of:
a Channel-State Information Reference Signal, CSI-RS; and
a Tracking Reference Signal, TRS.

In some but not necessarily all examples, the UE further comprises:
means for receiving, from the RAN node, a presence indicator for informing the UE of the transmission of the at least one RS by the RAN node.

While the above examples and options of the disclosure are described separately, it is to be understood that their provision in all possible combinations and permutations is contained within the disclosure.

According to at least some examples of the disclosure there is provided a Radio Access Network, RAN, node comprising:
means for receiving, from a User Equipment, UE, UE synchronization capability information indicative of time and/or frequency synchronization acquisition capability of the UE with a network; and
means for sending, to the UE, configuration information for at least one Reference Signal, RS, sent prior to a paging occasion for the UE that enables the UE to acquire time and/or frequency synchronization with the network, wherein the configuration information for the at least one RS is based in part on the UE synchronization capability information.

According to various, but not necessarily all, examples of the disclosure there is provided a method comprising:
receiving, at a Radio Access Network, RAN, node from a User Equipment, UE, UE synchronization capability information indicative of time and/or frequency synchronization acquisition capability of the UE with a network; and
sending, from the RAN node to the UE, configuration information for at least one Reference Signal, RS, sent prior to a paging occasion for the UE that enables the UE to acquire time and/or frequency synchronization with the network, wherein the configuration information for the at least one RS is based in part on the UE synchronization capability information.

According to various, but not necessarily all, examples of the disclosure there is provided computer program instructions for causing an apparatus to perform:
receiving, at a Radio Access Network, RAN, node from a User Equipment, UE, UE synchronization capability information indicative of time and/or frequency synchronization acquisition capability of the UE with a network; and sending, from the RAN node to the UE, configuration information for at least one Reference Signal, RS, sent prior to a paging occasion for the UE that enables the UE to acquire time and/or frequency synchronization with the network, wherein the configuration information for the at least one RS is based in part on the UE synchronization capability information.

According to various, but not necessarily all, examples of the disclosure there is provided an apparatus comprising:
at least one processor; and
at least one memory including computer program instructions;
the at least one memory and the computer program instructions configured to, with the at least one processor, cause the apparatus at least to perform:
receiving, at a Radio Access Network, RAN, node from a User Equipment, UE, UE synchronization capability information indicative of time and/or frequency synchronization acquisition capability of the UE with a network; and
sending, from the RAN node to the UE, configuration information for at least one Reference Signal, RS, sent prior to a paging occasion for the UE that enables the UE to acquire time and/or frequency synchronization with the network, wherein the configuration information for the at least one RS is based in part on the UE synchronization capability information.

According to various, but not necessarily all, examples of the disclosure there is provided a non-transitory computer readable medium encoded with instructions that, when performed by at least one processor, causes at least the following to be performed:
receiving, at a Radio Access Network, RAN, node from a User Equipment, UE, UE synchronization capability information indicative of time and/or frequency synchronization acquisition capability of the UE with a network; and
sending, from the RAN node to the UE, configuration information for at least one Reference Signal, RS, sent prior to a paging occasion for the UE that enables the UE to acquire time and/or frequency synchronization with the network, wherein the configuration information for the at least one RS is based in part on the UE synchronization capability information.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

The following portion of this 'Brief Summary' section describes various features that can be features of any of the examples described in the foregoing portion of the 'Brief Summary' section.

In some but not necessarily all examples, the UE synchronization capability information comprises one or more of:
information indicative of time and/or frequency domain aspects related to the UE acquiring time and/or frequency synchronization with the network;
information indicative of an amount and/or level of estimated time and frequency drift of the UE in a time period; and
information indicative of a number of the at least one RSs required by the UE for the UE to acquire time and/or frequency synchronization with the network.

In some but not necessarily all examples, the RAN node further comprises:
means for sending one or more characteristics of at least one RS intended to be sent to the UE, wherein the at least one RS intended to be sent by the RAN node enables the UE to acquire time and/or frequency synchronization with the network, and wherein the received UE synchronization capability information is based in part on the one or more characteristics of the at least one RS intended to be sent by the RAN node.

In some but not necessarily all examples, the one or more characteristics of the at least one RS comprises one or more of:
a time density of the at least one RS;
a bandwidth of the at least one RS;
a frequency domain density of the at least one RS;
a number of RSs or RS bursts in a time domain for a single RS transmission;
a number of Resource Elements, REs, in a symbol of the at least one RS;
a number of symbols in a slot or slots of the at least one RS; and
a time difference between symbols containing the RSs.

In some but not necessarily all examples, the at least one RS comprises one or more of:
a Channel-State Information Reference Signal, CSI-RS; and
a Tracking Reference Signal, TRS.

In some but not necessarily all examples, the RAN node further comprises:
means for defining at least one paging group for at least one UE based in part on the synchronization capability information received from the at least one UE.

In some but not necessarily all examples, the RAN node further comprises:
means for sending, to the UE, a presence indicator for informing the UE of the transmission of the at least one RS.

While the above examples and options of the disclosure are described separately, it is to be understood that their provision in all possible combinations and permutations is contained within the disclosure.

According to various, but not necessarily all, examples of the disclosure there are provided examples as claimed in the appended claims.

BRIEF DESCRIPTION OF THE DRAWINGS

For a better understanding of various examples of the present disclosure that are useful for understanding the detailed description and certain examples of the present disclosure, reference will now be made by way of example only to the accompanying drawings in which.

Figure 1:
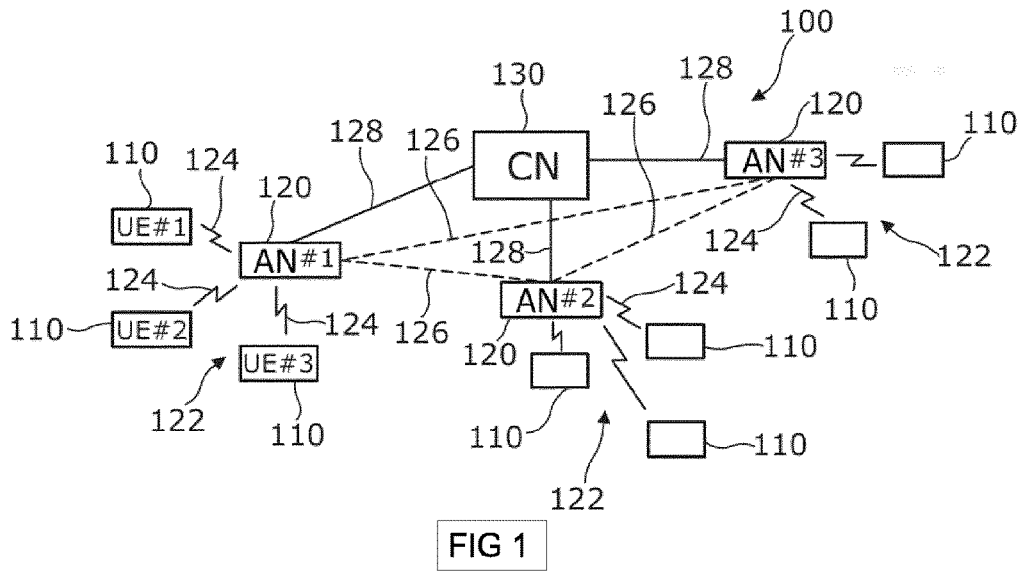
FIG. 1 schematically illustrates an example of a wireless communication network suitable for use with examples of the present disclosure.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

LIST OF ABBREVIATIONS 5G 5th Generation
5G-S-TMSI 5G Short Temporary Mobile Subscriber Identity
AMF Access and Mobility Management Function
BWP Bandwidth Part
CN Core Network
CSI-RS Channel-State Information Reference Signals
DL Downlink
DRX Discontinuous Reception
eDRX extended Discontinuous Reception
gNB Next Generation NodeB/gNodeB
IE Information Element
NG Next Generation
NG-RAN Next Generation Radio Access Network
NR New Radio/Next Radio
NW Network
PDCCH Physical Downlink Control Channel
PO Paging Occasion
PSS Primary Synchronization Signal
PTW Paging Transmission Window
RAN Radio Access Network
RRC Radio Resource Control
RS Reference Signals
SIB System Information Block
SSB Synchronization Signal Block
SSS Secondary Synchronization Signal
TRS Tracking Reference Signals
UE User Equipment
Uu Radio interface

DETAILED DESCRIPTION

FIG. 1 schematically illustrates an example of a network 100 comprising a plurality of network nodes including terminal nodes 110 (also referred to as User Equipment, UE), access nodes 120 (also referred to as RAN nodes), and core network 130.

The terminal nodes 110 and access nodes 120 communicate with each other. The core network 130 communicates with the access nodes 120. One or more core nodes of the core network 130 may, in some but not necessarily all examples, communicate with each other. The one or more access nodes 120 may, in some but not necessarily all examples, communicate with each other.

The network 100 may be a cellular network comprising a plurality of cells 122 each served by an access node 120. The interfaces between the terminal nodes 110 and the access nodes 120 are radio interfaces 124. The access nodes 120 comprise cellular radio transceivers. The terminal nodes 110 comprise cellular radio transceivers.

In the particular example illustrated, the network 100 is a Next Generation (or New Radio, NR) network. New Radio is the Third Generation Partnership Project (3GPP) name for 5G technology. The terminal nodes 110 are also known as User Equipment (UE).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility Management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e. Multi Radio Access Technology-Dual Connection (MR-DC), not least for example such as:

Evolved Universal Terrestrial Radio Access-New Radio Dual Connectivity (EUTRA-NR-DC, also referred to as EN-DC), New Radio-Evolved Universal Terrestrial Radio Access Dual Connectivity (NR-EUTRA-DC, also referred to as NE-DC), Next Generation Radio Access Network Evolved Universal Terrestrial Radio Access-New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node can be implemented as a single network equipment, or disaggregated/distributed over two or more RAN nodes, such as a central unit (CU), a distributed unit (DU), a remote radio head-end (RRH), using different functional-split architectures and different interfaces.

The terminal nodes 110 are devices that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

In the following description, an access node 120 will be referred to as an NG-RAN node 120, and a terminal node 110 will be referred to as a UE 110.

Figure 2:
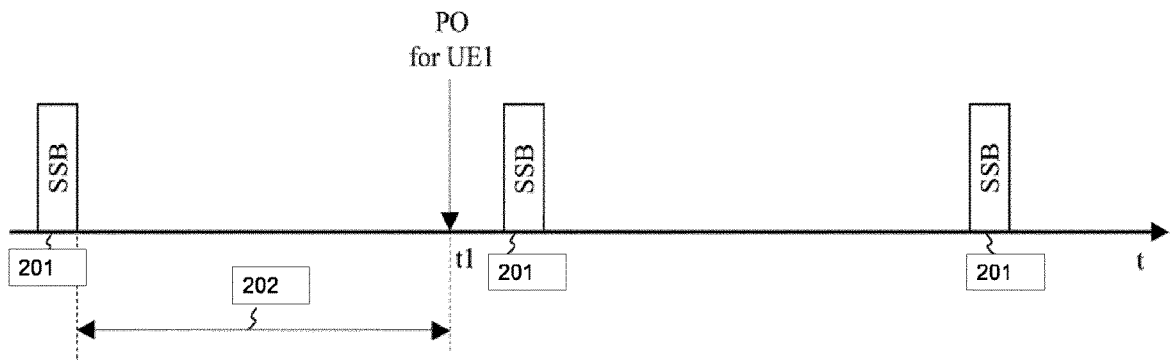
FIG. 2 shows an example of a paging occasion for a UE in a conventional RAN node.

FIG. 2 shows an example of a paging occasion for at least one UE in a conventional 5G RAN. An NG-RAN node (not shown) is configured to periodically broadcast at least one SSB 201. At least one UE, denoted as UE1, is configured to periodically receive the least one SSB 201 whilst it is in an inactive or idle RAN connection state (i.e. RRC inactive or idle state). UE1 has its own PO—at time t1 following transmission of an SSB. A PO is a specific time instance/window where the NG-RAN node may transmit a paging message(s) for one or more UE's having the same Paging Frame (PF), the PF being a radio frame which may contain one or more POs for a set of one or more UEs.

Rules are pre-known at the UE and the network allowing determination of the right POs based on, for example, a UE identifier, such as is defined in TS 36.304 Release 15 and TS 38.304 Release 15. The UE identifier is known within a 5G RAN, and thus the POs can be determined by the 5G RAN to enable Core Network (CN) level paging within a Tracking Area, and RAN level paging within the RAN Notification Area (RNA). However, before monitoring for paging messages, the UE has to perform tracking and Downlink (DL) time and/or frequency synchronization with its serving cell. Conventionally, UEs in RRC inactive or idle would perform such synchronization operations based on Synchronization Signal Blocks (SSBs) 201 transmitted by the NG-RAN node.

The SSB 201 is used by the UE to provide time-frequency synchronization with the RAN node and/or channel estimation, and this time-frequency synchronization and/or channel estimation is performed to make it possible for the UE to receive the paging message, if present, at the PO.

As shown in FIG. 2, the PO for UE1 is significantly time-spaced from the nearest SSB, hence UE1 would have a long waiting time period 202 between the receiving time of the nearest preceding SSB 201 and its PO, during which waiting period UE1 would be on/woken up rather than being in a sleep mode. In this regard, it is noted that, according to the NR UE power model (defined in Rel-16 TR 38.840), the power consumption of a deep sleep state is 1 power unit vs 20 power units consumed in light sleep and 45 power units in micro sleep. This thereby causes an increase in power consumption for the UE. Such issues regarding long waiting periods becomes more pronounced when the SSB 201 are broadcasted with a large periodicity, e.g. 80 or 160 subframes, or when the UE needs multiple SSB instances to achieve time/frequency synchronization. In this case, a UE which is monitoring for paging would need to wake up well in advance of its PO in order to receive the required number of SSBs to achieve time/frequency synchronization. This would increase the power consumption of the UE even more. By contrast, if the NG-RAN node instead sends the SSB more frequently (e.g. with a higher frequency, e.g. every 5 ms), the wait time and hence power consumption for UE may decrease but at the cost of a higher power consumption and increased signalling overhead of the RAN node itself.

Figure 3:
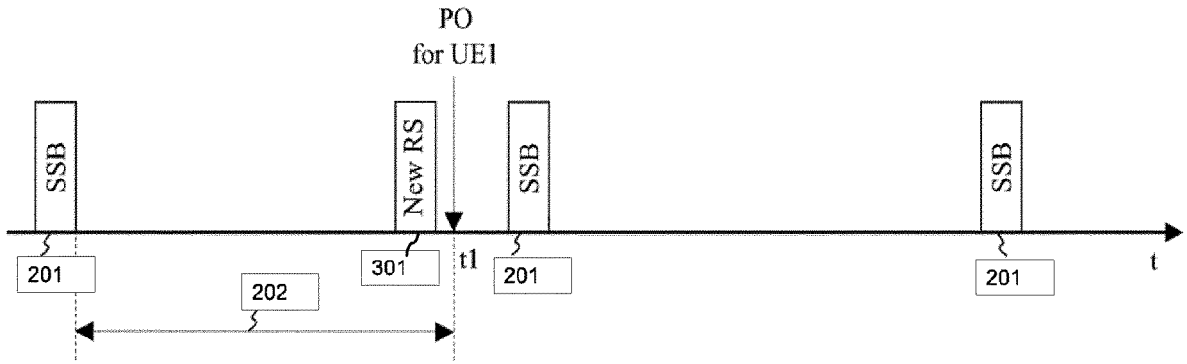
FIG. 3 shows an example of a reference signal transmitted prior to a paging occasion for a UE according to the present disclosure.

Examples of the present disclosure seek to address such issues and seek to mitigate, or even eliminate, such issues by provisioning additional Reference Signals (RS), i.e. in addition to or instead of the conventional SSB transmissions, that the UE can use for time/frequency synchronisation. The RS may be transmitted shortly before the PO, as is shown in FIG. 3 and discussed in greater detail below. This may enable the UE to remain in a sleep mode for a longer period of time and thereby provide an improved power saving benefit for the UE without imposing a disproportionate significant increase in the RAN node's power consumption and signalling overhead.

FIG. 3 shows an example of at least one reference signal or a burst of reference signals, RS 301, transmitted by the RAN node prior to a paging occasion, PO, for a UE, UE1 whilst the UE is in an RRC inactive or idle state.

The RS transmitted may be based on the SSBs or any part thereof (e.g., a Primary Synchronization Signal (PSS), and/or a Secondary Synchronization Signal (SSS) and/or one or more Demodulation Reference Signals (DM-RS) of the Physical Broadcast Channel (PBCH)), and/or a Channel-State Information Reference Signal (CSI-RS), and/or a Tracking Reference Signal (TRS).

Among the various functions of CSI-RS in NR, these RSs support synchronization, time/frequency tracking for demodulation and reference signal received power (RSRP) measurements for mobility. The currently defined CSI-RSs are applicable to UEs in RRC connected state only. In examples of the present disclosure, the CSI-RSs are provisioned for RRC inactive or idle states too. The CSI-RSs are configured on a per UE basis, but multiple UEs can share the same RS resources. NR supports a large flexibility in respect to the CSI-RS configuration. A resource can be configured with up to 32 ports, with a fully configurable density. In the time domain, a CSI-RS resource may start at any Orthogonal Frequency Division Multiplexing (OFDM) symbol of a slot and it can span 1, 2, or 4 OFDM symbols depending on the number of ports configured. CSI-RS can be periodic, semi-persistent or aperiodic (Downlink Control Information (DCI) triggered). For the use case of time frequency tracking, CSI-RS may be periodic, or aperiodic, with a single port configured, and the signal being transmitted in bursts of two or four symbols spread over one or two slots.

Tracking reference signals (TRS) are sparse set of reference signals, which are intended to assist the device in time and frequency tracking. The synchronisation signals (PSS, SSS) allow a relatively course synchronization while the TRS allows fine tuning. The TRS does not exist independently, and a specific CSI-RS configuration is used as TRS. More specifically, a TRS is a resource set consisting of multiple periodic Non Zero Power (NZP) CSI-RSs. More specifically, a TRS consists of four single-port, density-3 CSI-RSs located within two consecutive slots. The relatively high density helps to improve the UE's ability to track time and frequency offsets. A UE is typically configured with a periodic TRS with a periodicity of 10, 20, 40, or 80 ms. However, the UE may additionally be configured with an aperiodic TRS.

In 5G NR, a UE can use CSI-RS and/or TRS for time and/or frequency synchronization. The CSI-RS configuration are defined in TS 38.331 and its mapping to resources is defined in TS 38.211, e.g. showing how a certain density, number of ports, number of OFDM symbols, frequency domain allocation maps to certain time-frequency resources in the NR time-frequency radio resource grid. UE specific TRS/CSI-RS are currently defined only for UEs in RRC connected state, i.e. they are not currently defined for UEs in RRC inactive or idle states. For UEs in RRC inactive or idle states, these RSs may need to be provisioned in an initial Bandwidth Part (BWP), that is known to these UEs.

As part of NR, the concept of Quasi-Colocation (QCL) is introduced. In general, two signals transmitted from the same antenna port experience the same radio channel, whereas, if transmitted from two different antenna ports, they experience different radio conditions (e.g. in terms of Doppler Spread, Doppler Shift, average delay, delay spread, spatial filtering). However, there can be cases where two signals transmitted from two different antenna ports experience radio channels having common properties. In such cases the antenna ports and the signals are said to be Quasi-Colocation (QCL). 3GPP has introduced this QCL concept to help the UE when performing procedures such as channel estimation, frequency offset error estimation, and synchronization. For example, if the UE knows that the radio channels corresponding to two different antenna ports is QCL in terms of Doppler shift, then the UE can determine the Doppler shift for one antenna port and then apply the result on both antenna ports for channel estimation, thus avoiding doppler calculations for both antenna port separately, see TS 38.214, 5.1.5. TRS/CSI-RS QCL to SSB are assumed in various examples of the present disclosure.

In examples of the present disclosure, by provisioning CSI-RS/TRS for a UE in an RRC inactive or idle state, CSI-RS/TRS can be used for synchronizing the UE during an RRC inactive or idle state rather than relying on SSBs for UE synchronization. This may provide flexibility and power saving for the UE for performing DL tracking and synchronization in time and/or frequency before paging monitoring.

For the UE to be able to use CSI-RS/TRS for idle and inactive mode synchronization, the RS (i.e. CSI-RS/TRS) should be activated/transmitted by the NG-RAN node a short time before the UE's PO of its paging cycle is due, i.e. shortly before the time the UE would needs to wake up to monitor for a paging message in its paging occasion. This way, the UE would receive the reference signals it needs to synchronize with the network and prepare for the paging monitoring shortly prior to the UE's PO. This may enable the UE to avoid being awake for a number of (prior) SSB periods/instances before the PO in order to achieve synchronization (it being noted that the SSB periods may not be even aligned with the UE's paging cycle). This may lead to an increased sleep time for the UE and, in turn, increased UE power saving.

Examples of the disclosure may thereby enable reference signals, which are usually used only for the UEs in an RRC connected state (such as, for example, TRS and CSI-RS), to be made available for the UEs in the RRC inactive or idle states too.

Whilst only a single UE is illustrated for simplicity. It is to be appreciated that, in typical use, there may well be a plurality of differing UEs each having its own respective differing PO. One or more additional RSs may be provisioned for the plurality of UE. Also, as will be discussed further below with respect to FIG. 8, the respective PO's for the differing UEs may be re-scheduled, e.g. clustered together, so as to be proximal (in the time domain) to the transmission of the respective new RS.

Figure 4:
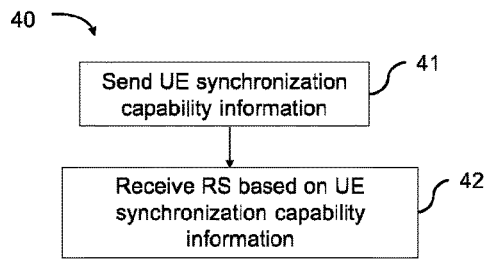
FIG. 4 schematically illustrates an example of a method according to the present disclosure.

FIG. 4 schematically illustrates an example of a method 40 according to the present disclosure that can be implemented by a UE.

The method comprises, at block 41, sending UE synchronization capability information to a Radio Access Network, RAN, node, wherein the UE synchronization capability information is indicative of time and/or frequency synchronization acquisition capability of the UE with a network.

In some examples, the UE synchronization capability information may be indicative of comprises one or more of:
information indicative of time and/or frequency domain aspects related to the UE acquiring time and/or frequency synchronization with the network;
information indicative of an amount and/or level of estimated time and frequency drift of the UE in a time period; and
information indicative of a number of the at least one RSs required by the UE for the UE to acquire time and/or frequency synchronization with the network.

Figure 9:
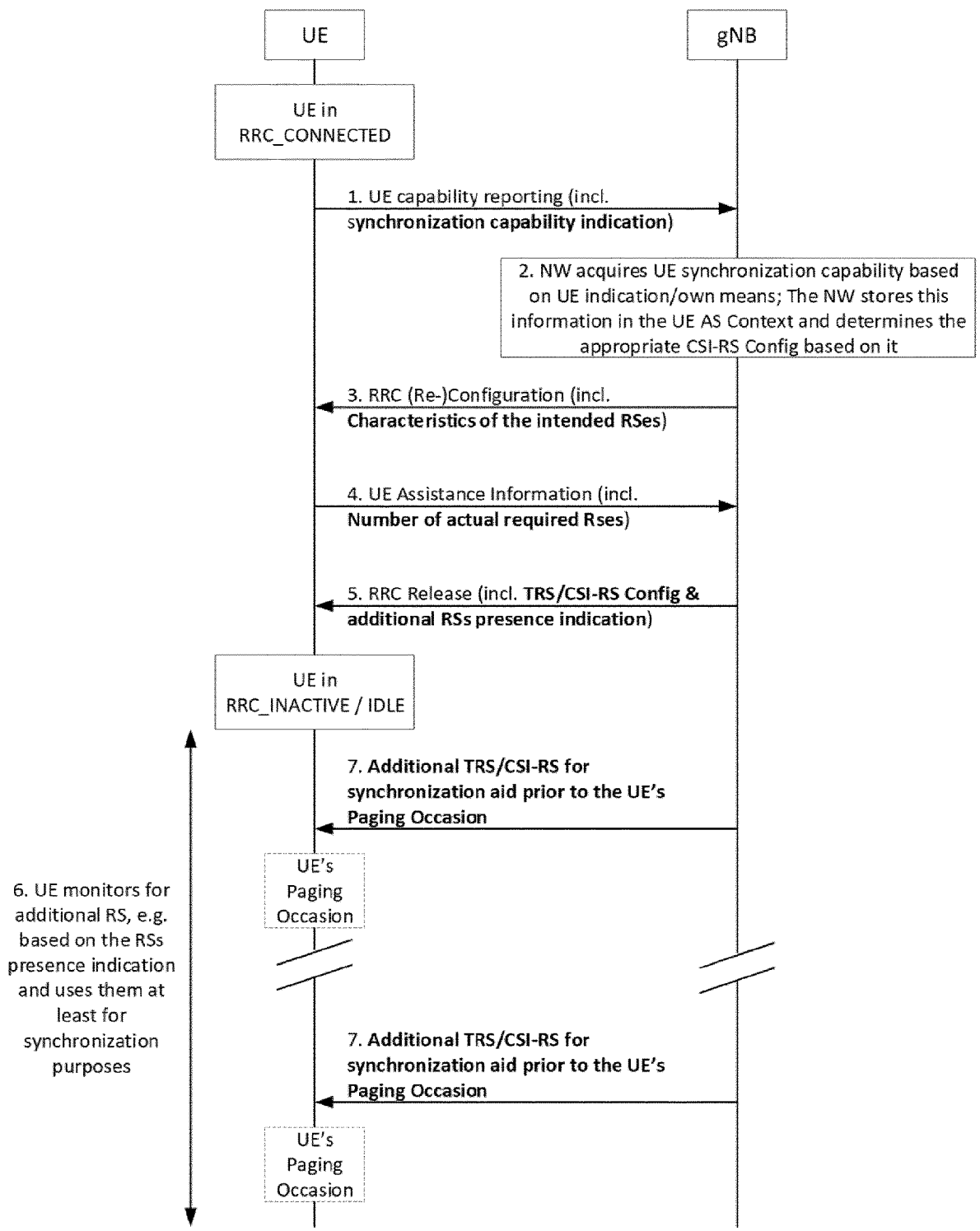
FIG. 9 schematically illustrates a further example of signalling between a RAN node and a UE according to the present disclosure.

In some examples, the UE synchronization capability information sent by the UE comprises one or more of:
the UE capability report sent by the UE in step 1 of FIG. 9 (as discussed further below with respect to FIG. 9), and
the UE assistance information sent by the UE in step 4 of FIG. 9 (as discussed further below with respect to FIG. 9), At block 42, at least one Reference Signal, RS, is received from the RAN node prior to a paging occasion for the UE, wherein the at least one RS enables the UE to acquire time and/or frequency synchronization with the network, and wherein the at least one RS is based in part on the UE synchronization capability information.

In some examples, the at least one RS comprises at least one from the group of:
a Channel-State Information Reference Signal, CSI-RS; and
a Tracking Reference Signal, TRS.

In some examples, the at least one RS received from the RAN node comprises the RS received from the RAN node in step 7 of FIG. 9 (as discussed further below with respect to FIG. 9).

In some examples, the method further comprises:
receiving one or more characteristics of at least one RS intended to be sent by the RAN node prior to a paging occasion for the UE, wherein the at least one RS intended to be sent by the RAN node enables the UE to acquire time and/or frequency synchronization with the network; and
determining the UE synchronization capability information based in part on the one or more characteristics of the at least one RS intended to be sent by the RAN node.

In some examples, the one or more characteristics of the at least one RS comprises one or more of:
a time density of the at least one RS;
a bandwidth of the at least one RS;
a frequency domain density of the at least one RS;
a number of RSs or RS bursts in a time domain for a single RS transmission;
a number of Resource Elements, REs, in a symbol of the at least one RS;
a number of symbols in a slot or slots of the at least one RS; and
a time difference between symbols containing the RSs.

In some examples, the method further comprises:
receiving, from the RAN node, a presence indicator for informing the UE of the transmission of the at least one RS by the RAN node.

Figure 5:
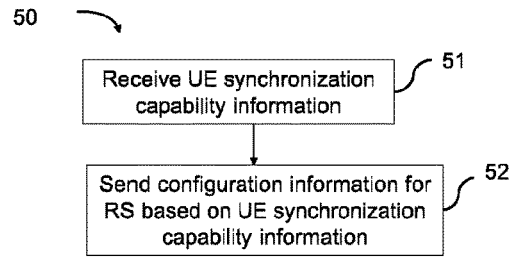
FIG. 5 schematically illustrates an example of signalling between a UE and a RAN node according to the present disclosure.

FIG. 5 schematically illustrates an example of a method 50 according to the present disclosure that can be implemented by a RAN node.

The method comprises, at block 51, receiving, from a User Equipment, UE, UE synchronization capability information indicative of time and/or frequency synchronization acquisition capability of the UE with a network.

At block 52, configuration information is sent to the UE, wherein the configuration information is for at least one Reference Signal, RS, that is to be sent prior to a paging occasion for the UE, wherein the at least one Reference Signal enables the UE to acquire time and/or frequency synchronization with the network, and wherein the configuration information for the at least one RS is based in part on the UE synchronization capability information.

In some examples, the configuration information sent to the UE comprises the RS configuration information sent to the UE in step 5 of FIG. 9 (as discussed further below with respect to FIG. 9).

In some examples (not shown in FIG. 5 but shown with respect to step 7 of FIG. 9), the RAN node sends the at least one RS to the UE prior to the UE's paging occasion.

In some examples, the method further comprises:
sending one or more characteristics of at least one RS intended to be sent to the UE, wherein the at least one RS intended to be sent by the RAN node enables the UE to acquire time and/or frequency synchronization with the network, and wherein the received UE synchronization capability information is based in part on the one or more characteristics of the at least one RS intended to be sent by the RAN node.

In some examples, the method further comprises:
defining at least one paging group for at least one UE based in part on the synchronization capability information received from the at least one UE.

In some examples, the method further comprises:
sending, to the UE, a presence indicator for informing the UE of the transmission of the at least one RS.

Figure 6:
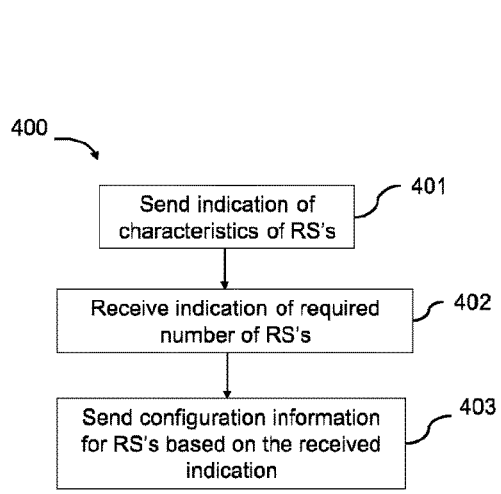
FIG. 6 schematically illustrates an example of a method according to the present disclosure.

FIG. 6 schematically illustrates an example of a method according to the present disclosure that can be implemented by a RAN node.

The method comprises, at block 401, sending, to at least one User Equipment, UE, whilst the at least one UE is in an active RAN connection state, at least one first message comprising information indicative of one or more characteristics of at least one Reference Signal, RS, that is intended to be sent to the at least one UE: after the at least one UE has been transitioned to an inactive or an idle RAN connection state, and prior to at least one paging occasion for the at least one UE (i.e. the RS is intended to be sent prior to at least one paging occasion for the at least one UE whilst the at least one UE is in an inactive or idle RAN connection state). The at least one RS is suitable for use in enabling the at least one UE to acquire time and/or frequency synchronization with the RAN node.

In some examples, the at least one RS comprises at least one from the group of:
a Channel-State Information Reference Signal, CSI-RS; and
a Tracking Reference Signal, TRS.

In some examples, the one or more characteristics of the at least one RS comprises at least one from the group of:
a time density of the at least one RS,
a bandwidth of the at least one RS,
a frequency domain density of the at least one RS,
a number of RSs or RS bursts in a time domain for a single RS transmission,
a number of Resource Elements, REs, in a symbol of the at least one RS,
a number of symbols in a slot or slots of the at least one RS, and
a time difference between symbols containing the RSs.

In some examples, the paging occasion comprises at least one from the group of:
a discontinuous reception, DRX, ON period, and
a paging monitoring occasion within a paging cycle.

In some examples, the RAN node may also send paging information to the UE, such paging information may be comprised in the first message.

In some examples, prior to sending the first message, at least one message comprising information indicative of the at least one UE's synchronization capabilities may be received by the NG-RAN node from the at least one UE. The information indicative of the at least one UE's synchronization capabilities may comprise UE synchronization capability information indicative of time and/or frequency synchronization acquisition capability of the at least one UE with a network. In some examples, the UE synchronization capability information is based on a paging cycle, such as cell-default paging cycle. Based in part on the UE's synchronization capabilities, the NG-RAN node determines the at least one RS, and/or one or more characteristics of the same, that is intended to be sent to the at least one UE prior to the at least one paging occasion for the at least one UE when the at least one UE is in an inactive or an idle RAN connection state. The information indicative of the UE's synchronization capabilities may comprise at least one from the group of: an indication of the at least one UE's ability to maintain synchronization with the RAN node, and an estimated time and frequency drift of the at least one UE over a given time period (drift rate). Such a time period may correspond to a period of a paging cycle, a period of a DRX cycle, a transmission slot, a radio sub-frame, a radio frame, or to another fixed time period, such as a millisecond, a second, a minute, or an hour. Such a time/frequency drift may be measured in ±ppm (parts-per-million). For example, for a drift of 20±ppm after 1 million actual parts, the actual number may vary in the range from 999,980 to 1,000,020. In the context of the present disclosure, the "parts" can be e.g. seconds or minutes. As an example, a clock drift rate of 1 s/min would result in an adjustment by 1 mini-slot in 5G NR (i.e. 2 OFDM symbols with length of 0.143 ms) every 143 min (~2.3 hours).

At block 402, in response to the at least one first message, at least one second message is received from the at least one UE. The at least one second message comprises information indicative of whether, and/or to what extent the UE can acquire time and/or frequency synchronization with intended RS.

In some examples, responsive to receipt of the at least one first message, the at least one UE determines information indicative of whether, and/or to what extent, zero, one or more RSs would be required by the at least one UE for the at least one UE to acquire time and/or frequency synchronization with the RAN node. Such a determination may be based in part on the indication of the one or more characteristics of at least one intended RS received from NG-RAN node in the first message. The determination may also be based in part on paging information, which may be comprised in the first message. The determination may also be based in part on synchronization capability and time/frequency drift of the UE, as well as the synchronization algorithm(s) employed by the UE. The UE may then send to the NG-RAN node, in the at least one second message, the determined information indicative of whether, and/or to what extent, zero, one or more RSs would be required.

In some examples, the at least one second message comprises information indicative of a number of the at least one RSs required by the at least one UE for the at least one UE to acquire time and/or frequency synchronization with the RAN node.

In some examples, the first message comprises a System Information Block, SIB, message.

In some examples, the first message comprises a message for requesting the second message.

In some examples, a presence indicator for informing the at least one UE of the one or more RSs to be to be sent prior to the at least one paging occasion for the at least one UE after the at least one UE has been transitioned into an inactive or an idle RAN connection state, may be sent by the NG-RAN node, wherein the sending of the presence indicator is based in part on the information received in the at least one second message.

In block 403, configuration information is sent to the at least one UE, wherein the configuration information is for one or more RSs that is/are to be sent to the at least one UE after the at least one UE has been transitioned to an inactive or an idle RAN connection state, and prior to the at least one paging occasion for the at least one UE. The sending of the configuration information is based in part on the information received in the at least one second message.

In some examples, the configuration information sent is configuration information that has been determined based on information indicated by the UE, such as the number of RSs or additional RSs that the UE indicated, in the second message, that it would require to acquire time and/or frequency synchronization. For example, configuration information may be determined and sent to the UE for at least the number of RSs that the UE indicated it would require to acquire time and/or frequency synchronization.

In examples of the disclosure, by advertising to a UE (when the UE is in an active RRC state) the characteristics of RSs the RAN node intends to send when the UE is in an inactive or idle RRC state, the UE is able to use such RS characteristics to determine the number of RSs that it would require to acquire synchronization when it subsequently is transitioned to an inactive or idle RRC state. The UE can then inform the RAN node of the same (whilst still in an active RRC state), based on which the RAN node can tailor the RSs that are subsequently to be sent to the UE when the UE is in an inactive or idle RRC state so that the RSs may be used efficiently by the UE.

Accordingly, when the UE is in an RCC connected state and does have synchronization with the network, it can report information on its synchronization capability and time/frequency drift, whilst also accounting also for the synchronization algorithm(s) employed by the UE, that allows the network to properly assign the right time-density of additional RSs to transmit when the UE is in an RCC inactive or idle state and does not have synchronization with the network.

Advantageously, such a report from the UE comprising UE assistance information concerning its synchronisation capabilities and RS requirements (provided in the second message of block 402) in view of the characteristics of the intended RS (provided in the first message of block 401), may enable the RAN node to provision the RSs in an optimally efficient manner, i.e. such that the RSs can be made available in the right cell, at the right time, for the UE, and in the right amount so as to be optimally useful for the UE and increase the amount of time the UE can remain in a sleep mode in a DRX cycle. In this regard, the received information from the UE may be used to assist the RAN node in tailoring the RS that are to be sent to the UE once in an inactive or idle RRC state. For example, the time density of RS to be sent may be modified based on the UE assistance information of the second message so as to provide the UE with sufficient RS, i.e. in a periodic burst/transmission of RS, so that the UE can acquire synchronization from a single such period burst/transmission of RS and avoid the need to wake up early for several instances of cycles of RS transmissions, such that the UE might be able to remain in a DRX state for longer and hence conserve energy.

Figure 7:
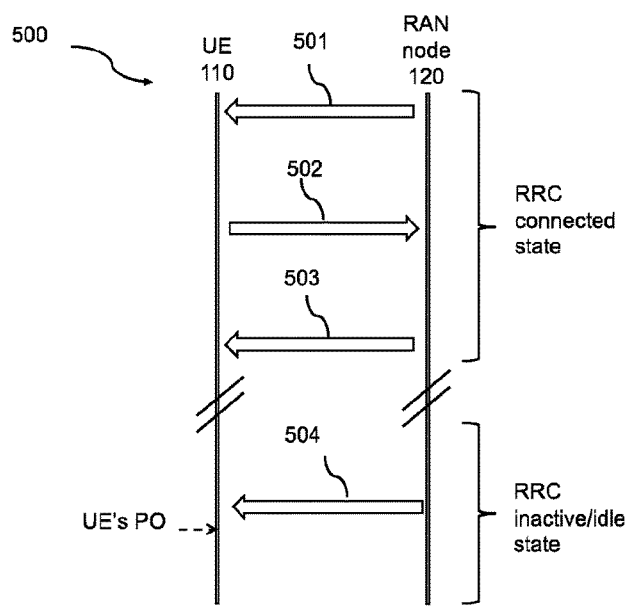
FIG. 7 schematically illustrates an example of signalling between a RAN node and a UE according to the present disclosure.

FIG. 7 schematically illustrates an example of signalling 500 between a RAN node 120 and a UE 110 according to the present disclosure.

The signal/transmission/information 501 sent from the RAN node 120 to the UE 110 corresponds to the first message of block 401 of FIG. 6. In some examples, this signal advertises (or is indicative of) the time-density of RSs intended to be inserted prior to a DRX ON period for a UE.

The signal/transmission/information 502 sent from the UE 110 to the RAN node 120 corresponds to the second message of block 402 of FIG. 6. In some examples, this signal reports the number of RSs or of additional RSs required by the UE to achieve time and/or frequency synchronization.

The signal/transmission/information 503 sent from the RAN node 120 to the UE 110 corresponds to the configuration information of block 403 of FIG. 6. In some examples, this signal is used to configure the RSs inserted prior to the respective DRX ON periods such that they are tailored to the UE's requirements (i.e. as determined based on the signal 502/second message of block 402). The RSs are configured so as to be sent within the at least one UE's DRX cycle shortly before the at least one UE's PO (thereby maximising the period of time during the DRX cycle where the UE may remain in a sleep/low power mode).

The signals 501-503 are sent/received whilst the UE is in an RRC connected state.

The signal 503/configuration information may be sent in an RRC message, such as an RRC suspend/release message for transitioning the UE to an inactive or idle RRC state. Additionally, or alternatively, the configuration information could be provided and/or updated via SIB, e.g. after the UE transits to an inactive or idle RRC state.

Following a transition to an inactive or idle RRC state (e.g. via RRC signalling not shown), the RAN node sends the one or more RSs 504, i.e. such RSs that have been configured via signal 503 (i.e. the third message of block 403) based in part on the at least one UE's assistance information provided in signal 502 (i.e. the second message of block 402). The one or more configured RSs 504 are sent to the at least one UE prior to the DRX ON period of the at least one paging occasion for the at least one UE.

Shortly after the sending of the one or more RSs 504, the RAN node may send a paging message (not shown) in the PO for the at least one UE.

Whilst only a single transmission of RSs 504 prior to a single PO is shown in FIG. 7, it is to be appreciated that, in typical use, there may well be a plurality of cycles of such RS transmissions and PO's for the UE. The sending of the one or more RSs 504 may be repeated over a cycle period corresponding to the cycle period of the UE's PO's and/or a DRX period of the UE.

Assuming a NG-RAN node can afford to spend additional resources for the purpose of providing additional RSs (e.g. TRS/CSI-RS) to UEs in RRC inactive or idle state, these RSs have to be available in the right cell, at the right time, for the right UEs, and in the right amount for a UE to be useful. In examples of the disclosure, the network can benefit from acquiring information on the UE's synchronization capability and use the same to determine whether it is beneficial to provide additional or fewer RSs, and also to determine how many RSs would be required for achieving the synchronization for a given UE in an RRC inactive or idle state. The ability to provide an appropriate amount of RSs to a UE speeds-up UE synchronization which may enable the UE to remain in a sleep mode for a longer period of time and thereby may reduce UE power consumption.

In some examples, a determination of at least one paging group for the at least one UE may be made, wherein the determination is based in part on the information received in the at least one second message. In this regard, the RAN node may determine, among a set of UEs (e.g. within an RNA or one or more cells), a subset of UEs for which paging occasions should be clustered based in part on the information received in the at least one second message of block 402. The RAN node may cluster the paging occasions for the subset of UEs in a time domain, e.g. cluster the POs of the subset of UE's based in part on the information received in the at least one second message such that the POs of UE's with similar synchronisation capabilities, requiring similar/close numbers/time densities of RSs, are clustered together in the time domain. Then the one or more RSs can be transmitted shortly prior to the clustered PO times.

Figure 8:
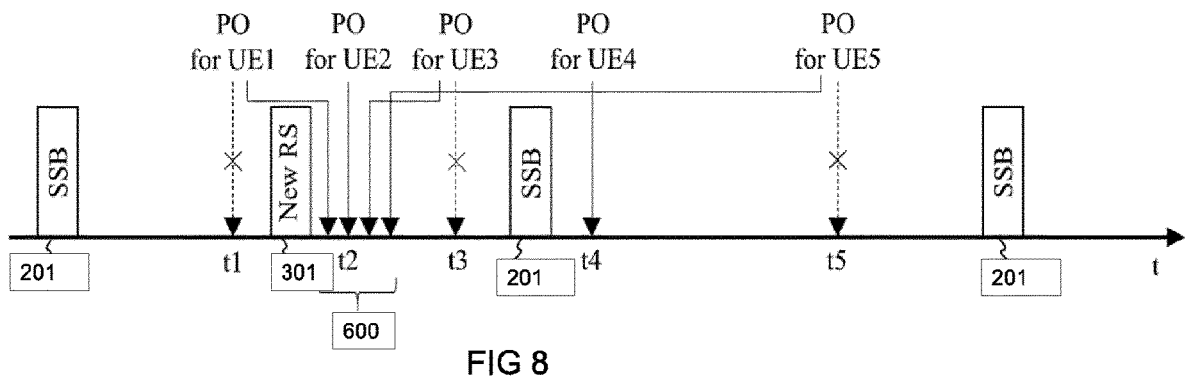
FIG. 8 shows an example of clustering paging occasions of UEs according to the present disclosure.

FIG. 8 shows an example of clustering paging occasions of UEs according to the present disclosure. Each of the five UEs (UE1, UE2, UE3, UE4 and UE5) are in an RRC inactive or idle state and each has its own PO, initially at times t1, t2, t3, t4 and t5 respectively.

In this particular example, the PO's for UE1, UE3 and UE5 POs are moved/re-scheduled so as to be clustered around the PO for UE2. In this regard, the initial POs for UE1, UE3 and UE5, which correspond to the times t1, t3 and t5 respectively are cancelled by the NG-RAN node (as is schematically shown by using crossed out dotted lines). Instead, new POs are configured for UE1, UE3 and UE5, which are aligned/clustered with the initial PO for UE2, i.e. near the time t2. In other words, the NG-RAN node forms a cluster 600 consisting of the new POs for the UE1, UE3 and UE5 and the initial PO (t2) for UE2. The NG-RAN node is then configured to broadcast the new RS 301 (comprising for example TRS and/or CSI-RS for UE1) for the cluster 600. As for UE4, since its initial PO is close to an SSB 201, there is no need to cancel it and configure a new PO for UE4 within the cluster 600 (provided UE4 needs only one SSB instance to achieve synchronization). In such a manner, in examples of the disclosure, only the POs which result in long waiting (awakening) periods for the UEs may only be subjected to said clustering.

In some examples, paging occasions timing are determined based primarily on a UE's identifier, UE ID. The UE ID used for paging computations in NR is the 5G Short Temporary Mobile Subscriber Identity, 5G-S-TMSI, which is assigned by the AMF for UE registration and which uniquely identifies a UE within the AMF. In order to configure new POs for a UE, the UE ID may need to be re-assigned in order to move the POs of the UE. It is envisaged that in future systems/implementations there may be differing/more lean means for enabling reassignment of POs.

It is to be appreciated that, in certain examples of the present disclosure, no clustering or re-clustering is performed. The transmission of RSs for a given UE can be simply based on the known UE ID to determine what POs the UE will monitor and apply the RSs respectively, i.e. using standard paging mechanisms and without any re-clustering/re-grouping of other UEs.

FIG. 9 schematically illustrates a further example of signalling between a RAN node and a UE according to the present disclosure.

New Information Elements (IEs) are introduced in the signalling messages transferred over the Uu in order to enable the proposed method (these new IEs are highlighted in bold in the figure).

In this example, as will be set out below, RSs (e.g. TRS or CSI-RS) are inserted and transmitted to a UE prior to DRX ON periods for UEs in an inactive or idle RRC connection state, (i.e. the RSs are sent shortly before the paging monitoring occasions of the UE within its paging/DRX cycle) in order to speed-up UE synchronization and enable an increase in the amount of time the UE is able to be in a sleep state thereby reducing UE power consumption.

This example proposes new UE assistance information that is related to the UE's synchronization capability and which may be indicative of time and/or frequency domain aspects related to acquiring the time-frequency synchronization with the network. Essentially, the UE assistance information could indicate to the network an amount/level of estimated time and frequency drift in a given time period, i.e. drift rate, which is unintended and depends on the quality of the local oscillator of the UE and its capability to maintain its nominal time and frequency. For example, cheaper UEs may have a larger frequency error or drift, meaning that these UEs will deviate from the nominal/actual frequency to a greater extent, and thus, they would require more RSs to be sampled to estimate the inaccuracy (e.g. to be able to discriminate the inaccuracy vs noise), in order to regain a frequency synchronization. Thus, such drift affects the time-frequency RSs' density required for the UE to acquire synchronization with the network. This indication/UE assistance information could be directly the level of drift in a certain time period (as described above), or an indication of a category of the UE's synchronization capability (e.g. quantized frequency drift). In the latter case, the UE can account for its synchronization algorithm (it being appreciated that two UEs experiencing the same amount of drift in a period may require more or less RSs based on the respective synchronization algorithms used by the UEs as well as depending on their capability to e.g. differentiate inaccuracy vs noise comparing fewer samples in time). The time period in afore described drift or synchronization capability could be based on the paging cycle, assuming single monitoring per paging cycle.

As will be discussed in further detail below, the network advertises the characteristics of the intended RSs, such as bandwidth, frequency domain density, (providing e.g. information about the number of REs in a single symbol) or number of symbols in a slot or slots and time difference between the symbols containing the RSs to be inserted prior to the DRX ON period (e.g. first paging monitoring occasion in a Paging Frame) of a UE, e.g. based on the knowledge of default drifts, if available, for example based on statistical values. The network could advertise this information e.g. in a SIB message or as a part of the signalling procedure to obtain the UE assistance information. Then the UE reports whether it requires additional RSs and the required number of such RSs to achieve time/frequency synchronization (in order to start decoding PDCCH during the DRX ON period). The UE indication could be provided assuming that these additional RSs would be transmitted after a certain time has elapsed from the last synchronization. This information could be for example reported as part of UE assistance information. This could be for example included into the existing overheating IE, to be provided by the UE when in RRC Connected, i.e. before the UE is moved to the RRC inactive or idle state. This UE assistance information could be based on network informing the UE on the RS characteristics and/or paging configuration.

The RAN node may then use this newly reported UE assistance information to tailor the number of RSs to be inserted prior to the respective paging occasion(s) and/or define paging groups. This can be based on UE ID (which is known to the RAN node) to determine what PO the UE will monitor and apply the RSs respectively without any grouping of other UEs, i.e. using standard paging mechanisms.

It is to be appreciated that examples of the present disclosure can be applied to multi-beam deployments (i.e. where the network uses multiple SSB beams). In multi-beam deployments, the beam selection in an RRC inactive or idle state may be up to the UE implementation and the network may be unaware of the beam the UE will use for receiving the additional RSs and for monitoring paging. In multi-beam deployments, the transmission of the additional RSs to UEs in RRC inactive or idle can be provisioned using a beam-sweeping approach (i.e. via all SSB DL beams). In view of this, the transmissions of additional RSs to UEs in an RRC inactive or idle state may not be optimally suited to Frequency Range 2 (FR2) deployments. In FR2 there might be many SSB beams configured (up to 64, depending on the subcarrier spacing), and thus too many additional RSs would have to be inserted in a Time Division Multiplex (TDM) fashion since, currently, analog beamforming is used at the RAN node (i.e. the transmission of different SSB beams cannot occur in parallel, but has to happen one SSB beam at the time due to limitations in the PA architecture and, in turn, in the transmission power). For FR1, there are fewer beams configured and digital beamforming can be assumed (allowing to transmit all/several SSB beams at the same time) and therefore it is possible to insert the various RSs over the same time/frequency resources.

Initially the UE is in an active RAN connection state, such as an RRC connected state (e.g. RRC_CONNECTED in terms of the RRC protocol).

In step 1, whilst the UE is in its RRC connected state, the UE sends a message reporting to its serving cell, gNB, an indication of its synchronization capability. This may comprise an indication as to the UE's synchronization capability and/or benefit/need of the UE to receive additional RSs while in RRC inactive or idle state, (e.g. RRC_INACTIVE or RRC_IDLE in terms of the RRC protocol).

The synchronization capability may be associated to an RRC state and be indicated for an RRC inactive or idle state. For example, the UE could indicate the need for additional RSs while in RRC inactive or idle state.

In some examples, the UE could indicate a parameter N, that relates to a number of SSBs occasions it would require to achieve synchronization. In some examples, the UE could indicate a parameter T that relates to how long the UE could maintain the timing/synchronization (which would be indicative of e.g. the level of time drift) or amount of drift expected in certain time. In some examples, additionally or alternatively, the UE could indicate the number of additional RSs that it would require for performing synchronization, e.g. in terms of density, number of ports, number of OFDM symbols, frequency domain allocation. In some examples, additionally or alternatively, the UE could inform the network about time domain aspects related to acquiring/maintaining synchronization with the network.

In step 2, the network (NW)/serving cell gNB determines/acquires UE synchronization capability based on the UE indications (e.g. including potentially the parameters N and/or T proposed above or alike) received in step 1, and/or based on own means. The NW/gNB may add a UE synchronization capability indication as part of a UE AS Context, which remains stored at the network while the UE is in RRC inactive state.

In some examples, the NW could learn/derive N and/or T or alike, e.g. based on UE characteristics and UE behaviour related to e.g. previous paging responses or lack thereof. The number of RSs and the configuration to be provided to a UE may be determined based on the synchronization capability indication. For instance, a larger N leads to a larger number of RSs to be provisioned, in terms of any of the following element related to the CSI-RS config: density, number of ports, number of OFDM symbols, frequency domain allocation. For example, the periodicity of the RSs could be determined based on the UE synchronization capability. In one aspect, a smaller T leads to a more frequent allocation of said RSs.

The NW could also exchange the UE synchronization capability to its neighbours via Xn interface for example as part of the UE context. The exchange can occur e.g. during a handover preparation or along with the XnAP Retrieve UE Context Response.

The NW determines, based on the UE capability report message of step 1, whether or not it intends to send additional RSs to aid in the UE's synchronization once the UE has been transitioned into an RRC inactive or idle state. If the NW decides to send additional RSs, the NW also determines, based on the UE capability report message of step 1, characteristics of any such additional RSs it intends to send once the UE has been transitioned into an RRC inactive or idle state to aid UE synchronization. Such RS characteristics, and parameter values for the same, may include: bandwidth and frequency domain density of the intended RSs, a number of Resource Elements (REs) in a single symbol, a number of symbols in a slot or slots, a time difference between the symbols containing the RSs to be inserted prior to a DRX ON period and/or a number of RSs or RS bursts in time domain for single RS transmission.

In step 3, the NW indicates in a message to the UE, e.g. advertises, the characteristics of the intended additional RSs, i.e. additional RSs that intended to be sent after the UE has been moved to an RRC inactive or idle state to aid in the UE's synchronization when the US is in an RRC inactive or idle state. The NW may configure the UE to report UE assistance information related to UE synchronization.

In some examples, the message may comprise information indicative of characteristics and parameter values of the intended RSs including: bandwidth and frequency domain density of the intended RSs, providing information about a number of REs in a single symbol, providing information about a number of symbols in a slot or slots, providing information about a time difference between the symbols containing the RSs to be inserted prior to a DRX ON period, and/or providing information about a number of RSs or RS burst in time domain for single RS transmission.

In some examples, the message may comprise information indicative of a time period, which e.g. could be based on the intended paging cycle for the UE.

In some examples such information could be advertised in a SIB message.

In step 4, responsive to the above-described message of step 3 and the receipt of characteristics for the intended RSs, the UE provides a message to the gNB comprising UE assistance information including synchronization information, where for example it informs the NW about the need for and number of intended RSs required by the UE to achieve synchronization. This UE assistance information could be based on network informing the UE on the intended RS characteristics and/or paging configuration in the above-described message of step 3.

The gNB can use this UE assistance information to define paging groups for UEs it is serving and/or to tailor the number of RSs to be inserted prior to the respective paging occasion(s). This can be based on a known UE ID to determine what PO the UE will monitor and apply the RSs respectively without any grouping of other UEs, i.e. using standard paging mechanisms.

In some examples, the information in the message of step 4 may additionally or alternatively, comprise one or more parts of the information provided in the message of step 1.

The NW may subsequently decide to move the UE to RRC inactive or idle state based on e.g. data inactivity, following which the network may trigger activation of RSs (reference signals belonging to the serving cell) based on own metrics.

In step 5, the gNB sends an RRC Release message, with or without a Suspend Indication, to the UE which moves the UE to an RRC inactive or idle state respectively.

This message included configuration information for the additional RSs, e.g. CSI-RS configuration, for use in RRC inactive or idle states. This message may also optionally include an additional RSs presence indication. The presence indication may serve to inform the UE about the existence of the additional RSs that are to be transmitted whilst the UE is in an RRC inactive or idle state.

Following receipt of the message of step 5, the UE is transitioned into an RRC inactive or idle state. The UE may then enter into a sleep mode and perform periodic page monitoring using DRX.

In step 6, while the UE is in an RRC inactive or idle state, the UE starts periodically monitoring for the additional RSs, e.g. based on the received additional RSs presence indication, and uses the additional RSs at least for synchronization purposes.

In step 7, while the UE is in an RRC inactive or idle state, the gNB/serving cell periodically transmits the additional RSs (e.g. CSI-RS/TRS) for the UE, e.g. periodically according to the UEs synchronization capability and/or UE's Paging Occasion (PO). The additional RSs will be transmitted/inserted during a small fraction of time preceding a DRX ON period. A DRX cycle (paging cycle) is expected to be of the order of a few hundreds of milliseconds up to a few seconds, where a typical value of the paging cycle is 1.28 second, while the proposed RSs are inserted for a few ms only before the UE's paging occasion(s).

It is to be appreciated that CSI-RS can be shared by multiple UEs that share the same PO.

Examples of the disclosure may thereby enable the network to acquire information from the UE to assist the network in provisioning additional RS (e.g. CSI-RS/TRS) for UE RRC inactive or idle state efficiently, i.e. so as to provide the RSs in an amount and density which is adequate based on the given UE.

FIG. 9 represents one possible signalling scenario among others. Various of the signals are optional and need not be performed. For example, in certain implementations, step 1 may be optional and steps 3 and 4 are performed instead (in this implementation, the configuration information for the RS's of step 5 and the RS's of step 7 are based in part on the UE assistance information of step 4). In certain other implementations, steps 3 and 4 may be optional and step 1 is performed instead (in this implementation, the configuration information for the RS's of step 5 and the RS's of step 7 are based in part on the UE capability reporting step 1). In certain yet other implementations, steps 1, 3 and 4 are all performed (in this implementation, the configuration information for the RS's of step 5 and the RS's of step 7 can be based in part on either or both of the UE capability reporting step 1 and the UE assistance information of step 4).

Figure 10:
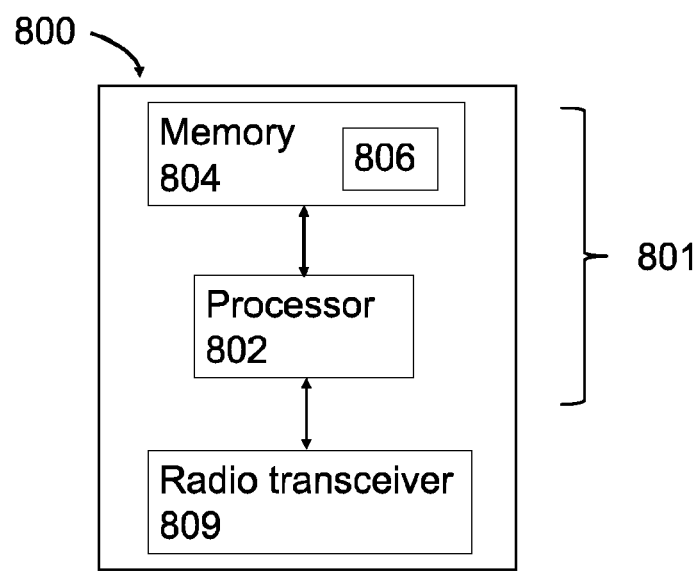
FIG. 10 schematically illustrates an example of an apparatus according to the present disclosure.

FIG. 10 illustrates an example of an apparatus 800 comprising a controller 801, which could be provided within a device such as a RAN node 120 or a UE 110, and which can also be coupled to a radio transceiver 809. The controller 801 can be embodied by a computing device, not least such as those mentioned above. In some, but not necessarily all examples, the apparatus can be embodied as a chip, chip set or module, i.e. for use in any of the foregoing. Implementation of the controller 801 may be as controller circuitry. The controller 801 may be implemented in hardware alone, have certain aspects in software including firmware alone or can be a combination of hardware and software (including firmware).

As illustrated in FIG. 10 the controller 801 may be implemented using instructions that enable hardware functionality, for example, by using executable instructions of a computer program 806 in a general-purpose or special-purpose processor 802 that may be stored on a computer readable storage medium (disk, memory etc) to be executed by such a processor 802.

The processor 802 is configured to read from and write to the memory 804. The processor 802 may also comprise an output interface via which data and/or commands are output by the processor 802 and an input interface via which data and/or commands are input to the processor 802.

The memory 804 stores a computer program 806 comprising computer program instructions (computer program code) that controls the operation of the apparatus 110, 120 when loaded into the processor 802. The computer program instructions, of the computer program 806, provide the logic and routines that enables the apparatus to perform the methods, processes, procedures and signalling described above and illustrated in FIGS. 3-9. The processor 802 by reading the memory 804 is able to load and execute the computer program 806.

Although the memory 804 is illustrated as a single component/circuitry it may be implemented as one or more separate components/circuitry some or all of which may be integrated/removable and/or may provide permanent/semi-permanent/dynamic/cached storage.

Although the processor 802 is illustrated as a single component/circuitry it may be implemented as one or more separate components/circuitry some or all of which may be integrated/removable. The processor 802 may be a single core or multi-core processor.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

In examples where the apparatus is provided within a UE 110, the apparatus therefore comprises:
- at least one processor 802; and
- at least one memory 804 including computer program code the at least one memory 804 and the computer program code configured to, with the at least one processor 802, cause the apparatus at least to perform:
  - sending, from a User Equipment, UE, to a Radio Access Network, RAN, node, UE synchronization capability information indicative of time and/or frequency synchronization acquisition capability of the UE with a network; and
  - receiving, at the UE from the RAN node, at least one Reference Signal, RS, prior to a paging occasion for the UE, that enables the UE to acquire time and/or frequency synchronization with the network, wherein the at least one RS is based in part on the UE synchronization capability information.

In examples where the apparatus is provided within a RAN node 120, the apparatus therefore comprises:
- at least one processor 802; and
- at least one memory 804 including computer program code
- the at least one memory 804 and the computer program code configured to, with the at least one processor 802, cause the apparatus at least to perform:
  - receiving, at a Radio Access Network, RAN, node from a User Equipment, UE, UE synchronization capability information indicative of time and/or frequency synchronization acquisition capability of the UE with a network; and
  - sending, from the RAN node to the UE, configuration information for at least one Reference Signal, RS, sent prior to a paging occasion for the UE that enables the UE to acquire time and/or frequency synchronization with the network, wherein the configuration information for the at least one RS is based in part on the UE synchronization capability information.

According to some examples of the present disclosure, there is provided a system (e.g. at least one UE 110 and a RAN node 120).

The UE 110, the RAN node 120 can be part of the Internet of Things forming part of a larger, distributed network.

Figure 11:
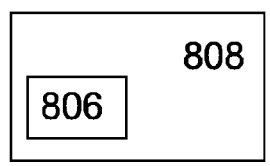
FIG. 11 schematically illustrates an example of a computer program according to the present disclosure.

As illustrated in FIG. 11, the computer program 806 may arrive at the apparatus 110, 120 via any suitable delivery mechanism 808. The delivery mechanism 808 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 806. The delivery mechanism may be a signal configured to reliably transfer the computer program 806. The apparatus 110, 120 may propagate or transmit the computer program 806 as a computer data signal.

In certain examples of the present disclosure, there is provided computer program instructions for causing a UE 110 to perform at least the following or for causing performing at least the following:
- sending, to a Radio Access Network, RAN, node, UE synchronization capability information indicative of time and/or frequency synchronization acquisition capability of the UE with a network; and
- receiving, from the RAN node, at least one Reference Signal, RS, prior to a paging occasion for the UE, that enables the UE to acquire time and/or frequency synchronization with the network, wherein the at least one RS is based in part on the UE synchronization capability information.

In certain examples of the present disclosure, there is provided computer program instructions for causing a RAN node 120 to perform at least the following or for causing performing at least the following:
- receiving, from a User Equipment, UE, UE synchronization capability information indicative of time and/or frequency synchronization acquisition capability of the UE with a network; and
- sending, to the UE, configuration information for at least one Reference Signal, RS, sent prior to a paging occasion for the UE that enables the UE to acquire time and/or frequency synchronization with the network, wherein the configuration information for the at least one RS is based in part on the UE synchronization capability information.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analogue and/or digital circuitry) and
(b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in FIGS. 3 to 9 can represent steps in a method and/or sections of code in the computer program 806. The illustration of a particular order to the blocks does not necessarily imply that there is a required or preferred order for the blocks and the order and arrangement of the block may be varied. Furthermore, it can be possible for some blocks to be omitted.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Where a structural feature has been described, it may be replaced by means for performing one or more of the functions of the structural feature whether that function or those functions are explicitly or implicitly described.

In some but not necessarily all examples, not least such as Enhanced Mobile Broadband (eMBB) use cases, the UE may embodied on a hand held portable electronic device, such as a mobile telephone, wearable computing device or personal digital assistant, that can additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

The UE may also refer to Internet of Things (I) devices, Industrial IOT devices, massive industrial networks, smart city infrastructure, wearable devices, networked medical devices, autonomous devices, etc. These types of UE devices may operate for extended periods of time without human intervention (e.g., perform maintenance, replace or recharge an on-device battery, etc.), may have reduced processing power and/or memory storage, may have reduced battery storage capability due to having small form factors, may be integrated into machinery (e.g., heavy machinery, factory machinery, sealed devices, etc.), may be installed/located in hazardous environment or difficult to access environments, etc.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in a module. As used here 'module' refers to a unit or apparatus that excludes certain parts/components that would be added by an end manufacturer or a user.

In some but not necessarily all examples, the UE 110 and the RAN node 120 are configured to communicate data with or without local storage of the data in a memory 804 at the UE 110 or the RAN node 120 and with or without local processing of the data by circuitry or processors at the UE 110, or the RAN node 120. The data may be stored in processed or unprocessed format remotely at one or more devices. The data may be stored in the Cloud. The data may be processed remotely at one or more devices. The data may be partially processed locally and partially processed remotely at one or more devices. The data may be communicated to the remote devices wirelessly via short range radio communications such as Wi-Fi or Bluetooth, for example, or over long-range cellular radio links. The apparatus may comprise a communications interface such as, for example, a radio transceiver for communication of data.

The processing of the data, whether local or remote, can be for the purpose of health monitoring, data aggregation, patient monitoring, vital signs monitoring or other purposes.

As used herein, the term "determining" (and grammatical variants thereof) can include, not least: deciding, calculating, computing, processing, deriving, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

In this description, references to "a/an/the" [feature, element, component, means . . . ] are to be interpreted as "at least one" [feature, element, component, means . . . ] unless explicitly stated otherwise.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The description of a function should additionally be considered to also disclose any means suitable for performing that function. Where a structural feature has been described, it can be replaced by means for performing one or more of the functions of the structural feature whether that function or those functions are explicitly or implicitly described.

Although examples have been described in the preceding paragraphs with reference to various examples, it should be appreciated that modifications to the examples given can be made without departing from the scope of the claims.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

Features described in the preceding description may be used in combinations other than the combinations explicitly described above.

Although functions have been described with reference to certain features, those functions may be performable by other features whether described or not. Although features have been described with reference to certain examples, those features may also be present in other examples whether described or not. Accordingly, features described in relation to one example/aspect of the disclosure can include any or all of the features described in relation to another example/aspect of the disclosure, and vice versa, to the extent that they are not mutually inconsistent. Although specific terms are employed herein, they are used in a generic and descriptive sense only and not for purposes of limitation.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some but not necessarily all examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

The examples of the present disclosure and the accompanying claims can be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

Whilst endeavouring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A user equipment (UE), comprising:
   at least one processor; and
   at least one memory storing instruction that, when executed by the at least one processor, causes the UE to perform:
   receiving, by the UE from a radio access network (RAN) node while the UE is in an inactive or an idle RAN connection state, one or more characteristics of at least one Reference Signal (RS) to be sent by the RAN node prior to a paging occasion for the UE;
   determining, by the UE, UE synchronization capability information based in part on the one or more characteristics of the at least one RS to be sent by the RAN node;

sending, to the RAN node, the UE synchronization capability information indicative of time and/or frequency synchronization acquisition capability of the UE with a network;

receiving, from the RAN node, a presence indicator for informing the UE of the transmission of the at least one RS by the RAN node;

receiving, from the RAN node, at least one RS, prior to the paging occasion for the UE, that enables the UE to acquire time and/or frequency synchronization with the network, wherein the at least one RS is based in part on the UE synchronization capability information, wherein the UE synchronization capability information comprises:

information indicative of time and frequency domain aspects related to the UE acquiring time and frequency synchronization with the network;

information indicative of an amount and level of estimated time and frequency drift of the UE in a time period; and information indicative of a number of the at least one RSs required by the UE for the UE to acquire time and frequency synchronization with the network, wherein the one or more characteristics of the at least one RS comprises:

a time density of the at least one RS;

a bandwidth of the at least one RS;

a frequency domain density of the at least one RS;

a number of RSs or RS bursts in a time domain for a single RS transmission;

a number of Resource Elements, REs, in a symbol of the at least one RS;

a number of symbols in a slot or slots of the at least one RS; and a time difference between symbols containing the RSs, wherein the at least one RS comprises:

a Channel-State Information Reference Signal, CSI-RS; and a Tracking Reference Signal, TRS.

* * * * *